United States Patent [19]

van Schoyck

[11] Patent Number: 5,257,198
[45] Date of Patent: Oct. 26, 1993

[54] METHOD OF TRANSMITTING EDGER INFORMATION TO A REMOTE NUMERICALLY CONTROLLED EDGER

[76] Inventor: Carol G. van Schoyck, 3112 E. 71 St., Tulsa, Okla. 74136

[21] Appl. No.: 809,973

[22] Filed: Dec. 18, 1991

[51] Int. Cl.⁵ .......................... G06F 15/46; B24B 7/00
[52] U.S. Cl. .......................... 364/474.02; 364/474.06; 340/825.23; 51/101 LG; 51/105 LG; 51/165.71
[58] Field of Search ............... 364/474.02, 474.06, 364/525; 51/165.71, 101 LG, 105 LG; 33/507; 340/825.22, 825.23

[56] References Cited

U.S. PATENT DOCUMENTS

| | | | |
|---|---|---|---|
| 4,423,569 | 1/1984 | Stern et al. | 51/165.71 |
| 4,656,590 | 4/1987 | Ace | 364/474 |
| 4,711,035 | 12/1987 | Logan et al. | 33/200 |
| 4,724,617 | 2/1988 | Logan et al. | 33/28 |
| 4,737,918 | 4/1988 | Langlois et al. | 51/165.71 |
| 4,781,452 | 11/1988 | Ace | 351/177 |
| 4,817,024 | 3/1989 | Saigoh | 364/577 |
| 4,912,880 | 3/1990 | Haddock et al. | 51/101 LG |
| 4,945,684 | 8/1990 | Wada et al. | 51/165.77 |
| 4,979,311 | 12/1990 | Bizer et al. | 33/507 |
| 4,989,316 | 2/1991 | Logan et al. | 29/527.3 |
| 4,991,305 | 2/1991 | Saigo et al. | 33/507 |
| 5,027,561 | 7/1991 | Brule et al. | 51/165.77 |
| 5,053,971 | 10/1991 | Wood et al. | 364/474.06 |
| 5,144,561 | 9/1992 | Soper | 364/474.35 |
| 5,148,637 | 9/1992 | Byron | 51/165.71 |

OTHER PUBLICATIONS

*Optical World* Sep. 1991 issue, p. 13, Jarratt et al.

*Primary Examiner*—Jerry Smith
*Assistant Examiner*—Paul Gordon
*Attorney, Agent, or Firm*—Head & Johnson

[57] ABSTRACT

A method by which an eye care professional can convey edger information to a remotely located optician having a numerically controlled edger capable of shaping and beveling lenses in which the eye care professional removes the demonstration lenses from frames which the wearer has selected, places the demonstration lenses on a pattern scale and aligns the horizontal axis of the lenses, traces the outline of each of the demonstration lenses on the pattern scale, places the pattern scale into an optical scanning digital data transmitter wherein the patterns of the lenses are converted to digital information, transmitting the digital information to a computer, and generating an output signal by means of the computer to drive a numerically controlled edger to cause the edger to shape and bevel eyeglass lenses to clone the demonstration lenses.

5 Claims, 3 Drawing Sheets

SLOPE 2

METHOD OF TRANSMITTING EDGER INFORMATION TO A REMOTE NUMERICALLY CONTROLLED EDGER

BACKGROUND OF THE INVENTION

Prescription ophthalmic lenses for eyesight corrective glasses must be edged to specific measurements and shapes to mount in eyeglass frames. The eye care doctor or other professional eye wear dispenser selects the frames and lenses for each patient's optical needs. Most eye care professionals stock frames at their location from which the patient makes his or her choice. The eye care professional then ships the frames to an optical laboratory so the lenses can be shaped to fit the frames.

The method of this disclosure eliminates the need to ship eyeglass frames to a location where the lens edging will be performed, thus eliminating the cost of shipping the frames and the time delay factor in furnishing such frames to off-site optical laboratories.

Systems presently being manufactured and marketed require either (a) expensive "Auto Cad" installations at the eye care dispensing location and the employment of under-utilized, highly skilled technicians to operate such equipment or (b) installing manually operated or computerized frame tracing capabilities, lens edging equipment, waste product disposal facilities, enlarged production facilities, and additional personnel at each eyeglass dispensing location. The investment required for either of the above options is multi-thousand dollars at each location. Competition from major corporations with large capital resources that operate the "One Hour" full service optical laboratories and retail stores in all major shopping malls is forcing more and more eye care professionals to invest their limited resources in the above described equipment and services. This competitive race is not for the normal cost effective reasons that usually reduce costs, but for reasons that have actually increased the cost of eyewear. Expensive, under-utilized equipment and operating personnel, at multiple locations, is wasteful and counter productive. The result of this trend may deprive many people of good vision care and in some cases all vision care. The method of this disclosure requires no additional capital investment to the eyewear prescriber or dispenser. It will eliminate the need for future capital expenditures at their locations and can make obsolete many that are already in place. No technical skill beyond that which is normal and customary will be required at a professional eyewear dispenser's location.

SUMMARY OF THE INVENTION

The ophthalmic lens pattern scale of this disclosure employs laser measurements with exact dimensions and will be provided as part of the system. The prescribing eyeglass doctor or eye glass dispenser is provided with an ophthalmic lens pattern scale that is described in the attached description of the preferred embodiment. The eye wear dispenser places eyeglass frames selected in an ophthalmoscope and marks the horizontal axis of the prescribed lens on the demonstration lenses provided by the frame manufacturer.

The eye wear dispenser, after removing the demonstration lenses from the frames, places the lenses on the ophthalmic lens pattern scale. He or she then aligns the identifying axis markings with the alignment markings on the pattern scale and traces the right and left demonstration lenses with a marking device furnished with the lens pattern scale.

Upon completion of the tracing the lens pattern scale is inserted into the digital data transmitter of this disclosure. This transmitter digitizes the shape and dimensions reflected on the lens pattern scale tracing and transmits this digital data via an existing data transmission carrier to an off-site laboratory or manufacturing location. A digital data receiver and processor is located at the receiving end and is activated by the electronic transmission signal. The data receiver automatically receives and stores the data until it is needed by an operator at the receiving location. The receiving operator, at his or her discretion, activates the data receiver and withdraws the digital data from storage, calls for the unit to automatically adjust for any data transmission distortion anomalies and to reconstruct the digital data receiver's preliminary interpretation of the lens pattern scale transmission. The data receiver unit automatically, in response to an operator command, adjusts and corrects to exact scale any tracing errors or omissions made by the eye wear provider at the point of origin. After performing these functions the exact cloned shape and size of the demonstation lenses are now in the digital database. Additionally, the receiver is designed to notify the operator to reject any reconstructed image or shape that is apparently too far out of tolerance for the unit to automatically correct. The operator, in this instance, will then notify the eye wear provider to make a correction on the lens pattern scale and to then re-transmit.

The operator, after determining that all functions are completed and that the data is structured to define the exact cloned shape and size of the demonstration lenses, calls for the receiver to convert automatically this data to a specific data interface format that is then transferred and recorded on a standard computer floppy disk that then contains computerized directions for a numerically controlled edger system. Edger systems which are provided by others, are common at most ophthalmic laboratories for edging lenses to mount in the frames.

A better understanding of the invention will be obtained by reference from the following description of the preferred embodiment, taken in conjunction with the attached drawings.

DESCRIPTION OF THE DRAWINGS

FIG. 1 illustrates the frames having the demonstration lenses therein positioned on an ophthalmoscope by which the horizontal axis of the demonstration lenses are marked.

FIG. 2 also shows a drawing pen. After the lenses are properly aligned with respect to the horizontal line they are traced onto the lens pattern scale with the drawing pen.

FIG. 5 illustrates that the computer finds a true coordinate system for the frame and the outline of the lenses.

FIG. 6 illustrates that the computer, by proper software programming, analyzes the image of one of the lenses and produces an optimum radius measurement for each of the lens.

FIG. 7 illustrates that the computer, by proper software programming, makes radial measurements taken at selected angles, in a clockwise or counterclockwise direction, of the lens outline.

FIG. 8 illustrates that the program within the computer provides for means to make tilt adjustment to find the true coordinate system for the two lenses and to find the true centers based on the true coordinate system.

FIG. 9 shows a frame digitizer scanning to locate the center point of the lens.

FIG. 10 illustrates that the computer program, after the correct center of a lens has been determined, determines the numerical data defining the outline of the lens.

FIG. 11 illustrates the program function wherein the digital signals have been generating defining the shape of both the right and left lenses and wherein the shapes can be compared to uncover possible error.

DESCRIPTION OF THE PREFERRED EMBODIMENT

Figure 1:
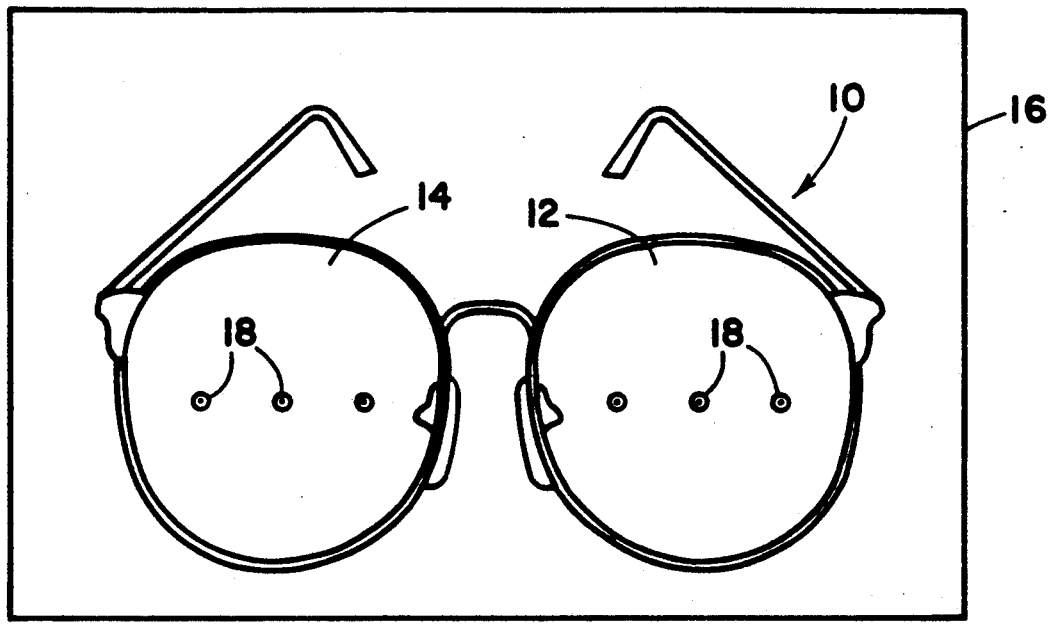
FIG. 1 illustrates eyeglass frames having demonstration lenses therein that have been selected by or for a user. It is an objective of the eye care provider to have lenses furnished by an optician with a prescribed refraction index ground therein to meet the ophthalmic needs of the patient and with edges to fit the frames.

The method of this invention for expeditiously providing information to a numerically controlled edger at a remote location for properly edging eyeglass lenses that have the proper prescription ground therein will be demonstrated as a sequence of steps. FIG. 1 shows the first step in which eyeglass frames, generally indicated by the numeral 10, have been selected by or for a patient. The eyeglass frames typically have a right demonstration lens 12 and a left demonstration lens 14 therein. The demonstration lenses 12, 14 typically do not have a refraction index ground therein but are provided by the manufacturer of eyeglass frame 10 to maintain the frames in proper shape during shipment and to better illustrate to the prospective user the appearance of the frames with glass therein. Further, demonstration lenses 12, 14, accurately define the shape of the lenses which must be inserted into frame 10 for proper use by the patient.

FIG. 1 shows the use of a ophthalmoscope 16 for marking the horizontal axis of the demonstration lenses before they are removed from the frame. The horizontal axis of the demonstration lenses before they are removed from the frame. The horizontal axis may be marked by the use of the ophthalmoscope by dots 18 marked on the demonstration lenses 12, 14. After marking dots 18 thereon the demonstration lenses are removed from frame 10.

Figure 2:
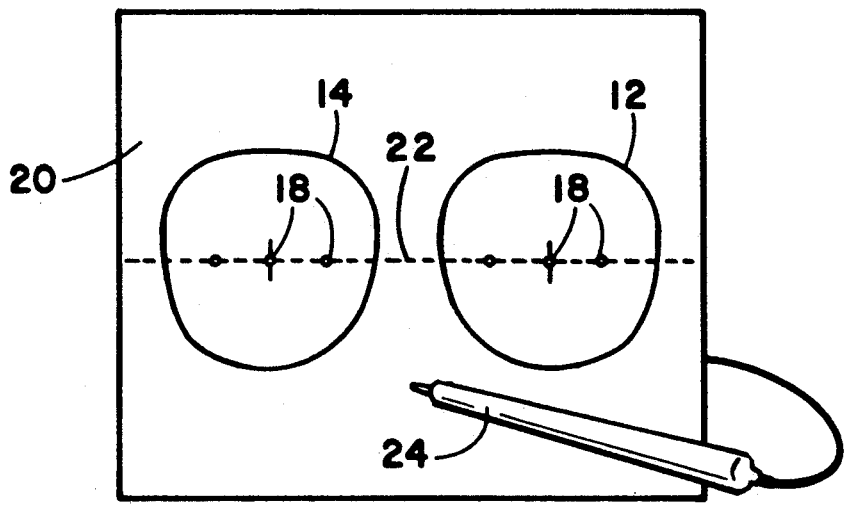
FIG. 2 shows the demonstration lenses having been removed from the frame and placed on a lenses pattern scale having a horizontal axis dashed line marked thereon.

Next, as shown in FIG. 2, the eye care provider places demonstration lenses 12, 14 onto a lens pattern scale 20 that has a horizontal axis marked thereon, indicated by the dotted line 22. The eye care provider aligns demonstration lenses 12, 14 so that dots 18 fall on the horizontal axis dotted line 22 and then, using a marking instrument 24, marks the outline of demonstration lenses 12, 14 onto lens pattern scale 20.

Figure 3:
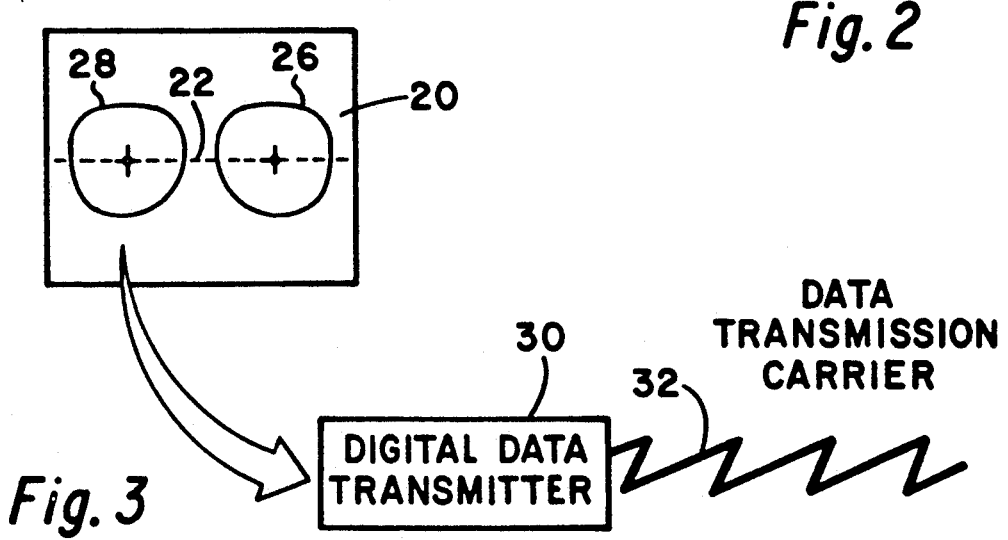
FIG. 3 shows a lens pattern scale as provided in FIG. 2 with the outline of the required lenses traced thereon that is fed into a digital data transmitter that converts the information contained on the ophthalmic lens pattern scale into digitized data that is transmitted by a data carrier that can be such as a telephone line in the same way that a facsimile message is transmitted.

FIG. 3 shows lens pattern scale 20 with the right demonstration lens outline 26 marked thereon and, in like manner, the outline 28 of left demonstration lens marked thereon.

Lens pattern scale 20 is then fed into a digital data transmitter 30 as shown in FIG. 3. The function of digital data transmitter 30 is to convert the information contained on the ophthalmic lens pattern scale 20 into digitized data that is then transmittable by any existing data transmission carrier 32, such as a telephone line. The digital data transmitter 30 is similar in function to a typical optical scanning digital data transmitter device or similar to a facsimile machine, in which the digital data representing the outline of the right and left demonstrator lenses 26, 28 is transmitted by carrier 32.

The steps utilized in the equipment discussed to this point are located at the office of the eye care provider. Thus, the eye care provider need have only an ophthalmoscope 16 for determining the horizontal axis of the lenses, and data digital transmitter 30. The lens pattern scale is in the form of paper blanks. Thus, only two actual pieces of equipment are required, one of which is the ophthalmoscope which is an indispensable and universally utilized instrument already in the possession of the typical eye care provider. Therefore, the only ancillary piece of equipment needed by the eye care provider to practice the system of this invention is digital data transmitter 30.

Figure 4:
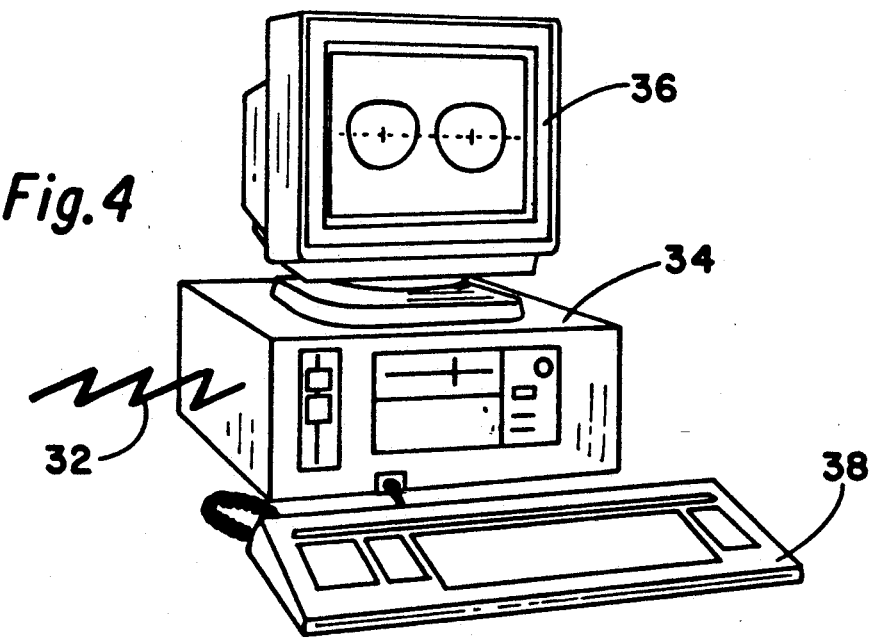
FIG. 4 illustrates a typical personal computer that is capable of receiving, storing and processing the digital data that contains information defining the outline of the demonstration lenses.

At the place where lenses are to be dimensioned to replicate or clone the demonstration lenses previously discussed there is located, as shown in FIG. 4, a computer generally indicated by the numeral 34, that may be in the form of a typical personal computer having a display 36 and keyboard 38. The computer 34 has memory to receive the digital data transmitted by carrier 32 and to store the data until it is required.

Figure 12:
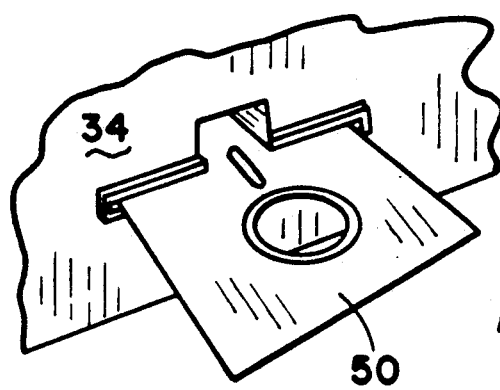
FIG. 12 shows that the program within the computer of FIG. 4 provides the digital signal necessary for operation of an edger and places the digital signal on a floppy disc within the computer that may be withdrawn from the computer for use as required.
Figure 13:
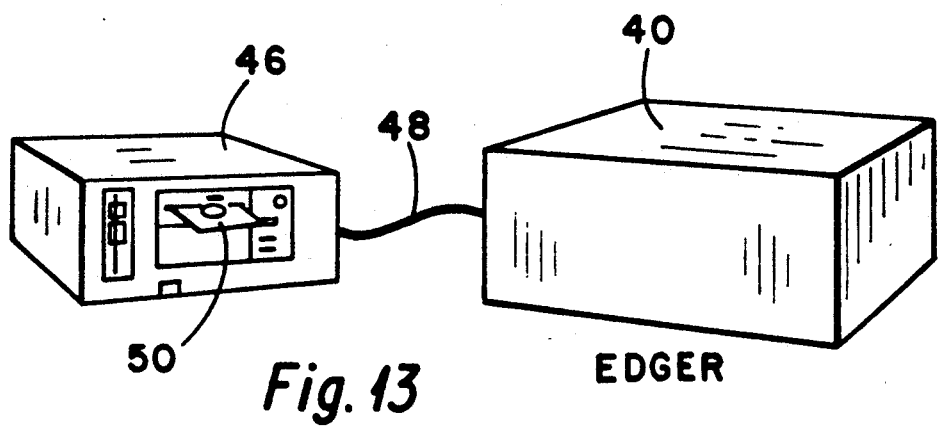
FIG. 13 illustrates the floppy disc having the digital information defining the outline of the left and right side lenses encoded therein being inserted into the file server of a numerically controlled edger system, the edger serving to shape and bevel the lenses so as to clone the demonstration lenses, after which the lenses can be delivered to the eye care provider for insertion into the frames so that they will be ready for use by the patient.

Upon initiation of a command signal, the data received from carrier 32 is processed within computer 34 to provide a digital signal necessary for operation of a numerically controlled edger, a commercially available piece of equipment as illustrated in FIG. 13. The edger as shown in FIG. 13 actually consists of two basic components, that is, an edger 40 that performs the physical task of shaping and bevelling a lens to the proper external circumferential configuration to replicate the demonstration lenses, and a control unit or file server 46. Edger 40 acts in conjunction with control unit 46 that provides the numerically control signals by conductor 48 to edger 40 in response to information provided from a floppy disc 50. The disc 50 is shown being inserted into the edger control unit 46. Thus, the function of computer 34 of FIG. 4 is to provide on disc 50, as seen in FIG. 12, the information necessary to operate edger control unit 46.

The step of converting the signals received by computer 34 into signals to be placed on disc 50 for utilization by edger control unit 46 employs a computer program, the basic steps of which are graphically illustrated in FIGS. 5-11.

Figure 5:
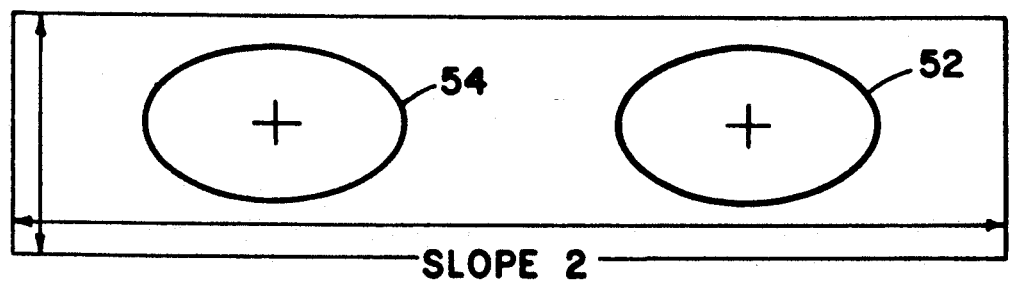
FIGS. 5-11 are illustrative of processing steps that take place within the computer.

FIG. 5 shows that the program first determines the true coordinate system for the eyeglass lenses. The coordinate system determines the height and width measurement and defines horizontal and vertical scaling factors, which step can employ initial comparison of data with the typical eyeglass lens outlines 52 and 54.

Figure 6:
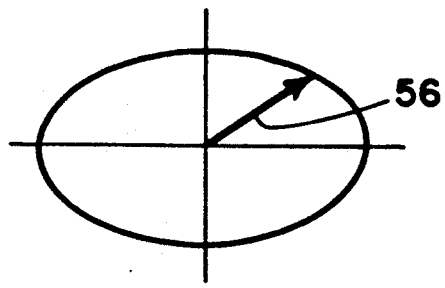

FIG. 6 shows step 2, that is, the computer analyzes the image of each lens and produces an optimum radius measurement for each lens, the radius being indicated by the numeral 56.

Figure 7:
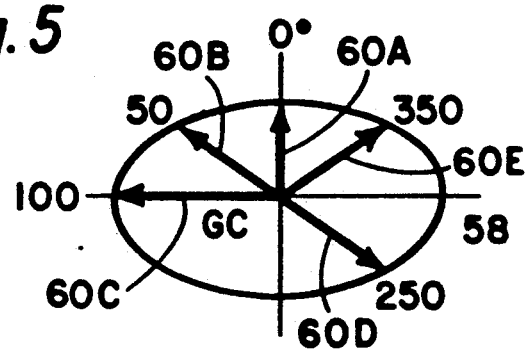

FIG. 7 illustrates step 3 wherein first radial measurements are taken at zero degrees which is perpendicular to the true X axis 58 of each lens. Subsequent measurements, exemplified by radial measurements 60B-60E, are taken in a clockwise or counterclockwise direction, the use of the counterclockwise direction being shown in FIG. 7.

Figure 8:
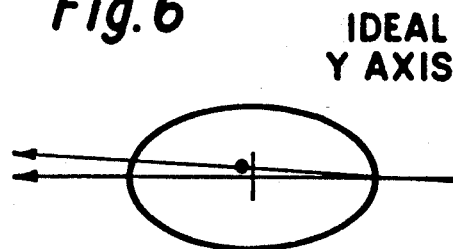
Figure 8:
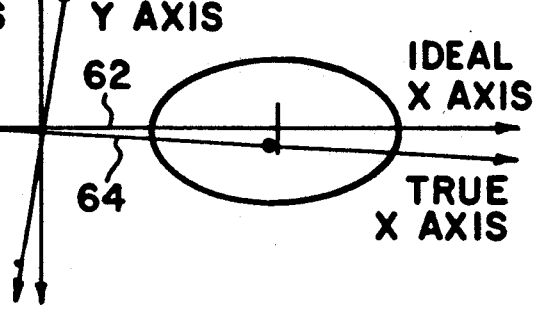

FIG. 8 shows the use of the program within computer 34 to make tilt adjustments to find the true coordinate system. In FIG. 8 the ideal horizontal coordinate is indicated by the numeral 62, and where the coordinate as detected by the data is illustrated by the numeral 64.

Figure 9:
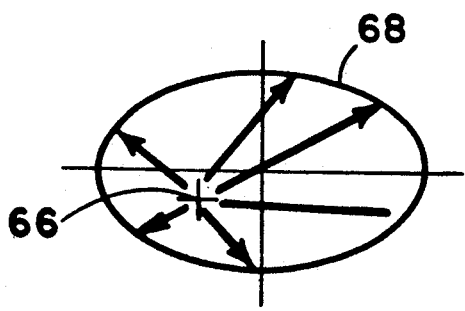

The computer program must next provide a system for locating the center of both the right and left lenses. This system is illustrated in FIG. 9 wherein a selected center 66 is tried and radial measurements made to the boundary 68 of the projected lens configuration. Upon analysis by the computer program the correct center 70 will be found.

Figure 10:
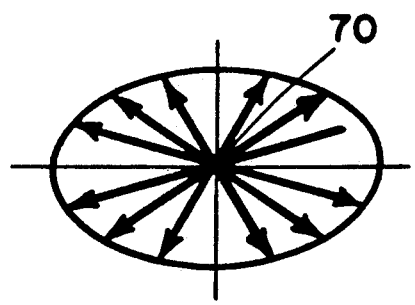
Figure 11:
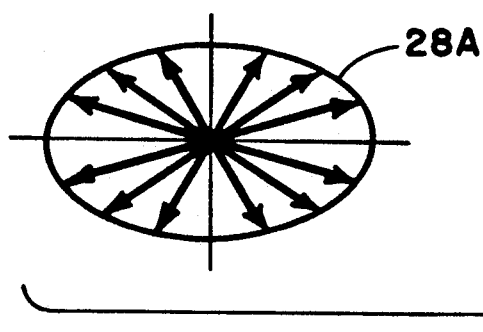
Figure 11:
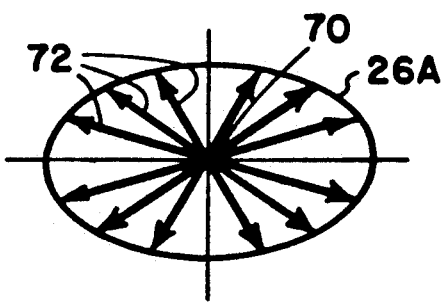

FIG. 10 shows the program having located the correct lens center 70. After correct lens center 70 is located, axial measurements 72, as seen in FIG. 11, can be made to determine the exact numerical data necessary to define the replicated outline of the right and left demonstration lenses indicated by the numerals 26A and 28A. Thus, by going through steps such as those graphically illustrated in FIGS. 5-11, but not necessarily in this prescribed order, the program within computer 34 has then generated digital data necessary for input into control unit 46 of edger 40 as shown in FIG. 13. This digital data as derived by the computer program employing the sequence of steps, such as graphically illustrated in FIGS. 5-11, is then applied to floppy disc 50 within the computer. The disc 50 can be removed from the computer for subsequent use.

When the optician desires to shape lenses to replicate the demonstration lenses, disc 50, which may be the typical inexpensive floppy disc as commonly utilized on personal computers, is then placed into edger control unit 46 and the proper lenses are then manufactured by edger 40.

The lenses, having the correct refractory prescription already ground therein, are then properly edged to replicate the demonstration lenses and can then be delivered to the eye care provider. The eye care provider can then insert such lenses into frame 10 for delivery to the patient.

It can be seen that the entire process of delivering the necessary data to the optician for replicating the demonstration lenses can be accomplished exceedingly expeditiously by the eye care provider with the requirement of only minimal technical skill. In like manner, the optician requires only the use of a personal computer 34 in conjunction with a numerically controlled edger having a control unit 46 to then produce the required lenses, also with minimum technical skill requirements.

It is apparent that the method of this invention can substantially reduce the time and expense of providing lenses for patients and therefore result in increased economy of providing eye care.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method by which an eye care professional can convey edger information to a remotely located optician in which the eye care professional has eyeglass frames selected by or for the user, the eyeglass frames having demonstration lenses therein, the optician having a numerically controlled edger capable of shaping and beveling lenses in response to digital information signals, comprising the steps of:
   (a) marking a horizontal axis on said demonstration lenses with an ophthalmoscopic while said demonstration lenses are in said eyeglass frames;
   (b) removing each said demonstration lens having said horizontal axis marked thereon from said eyeglass frames;
   (c) placing said demonstration lenses on a lens pattern scale having a horizontal axis line thereon and aligning said horizontal axis marked on each demonstration lens with the lens pattern scale horizontal axis line;
   (d) tracing an outline of each of said demonstration lens onto said lens pattern scale;
   (e) placing said lens pattern scale having said demonstration lenses outline marked thereon into an optical scanning digital data transmitter wherein the patterns of the lenses are converted to digital information signals, steps (a) through (e) being carried out at the location of said eye care professional;
   (f) transmitting said digital information signals by a data transmission carrier to a computer at the location of said optician, the data being received and stored in said computer; and
   (g) processing said digital information signals in said computer to provide operating instruction signals for use in said numerically controlled edger to cause said edger to shape and bevel eyeglass lenses to clone said demonstration lenses, the shaped and beveled lenses then being ready for delivery to said eye care professional for insertion into said eyeglass frames.

2. A method according to claim 1 wherein in step (g) said operating instruction signals provided by said step of processing said digital information signals in said computer are recorded on a computer disc, and the disc is inserted into a file server of said numerically controlled edger to cause said numerically controlled edger to shape and bevel eyeglass lenses to conform to said demonstration lenses.

3. A method according to claim 1 wherein in step (g) of processing said digital information signals in said computer to provide operating instruction signals for use in said numerically controlled edger comprises the steps of:

(1) finding a coordinate system to establish the horizontal axis of the lenses;

(2) analyzing images of each lens and providing an optimum center for each lens;

(3) taking a sequence of radial measurements from said optimum center of each lens in a clockwise or counterclockwise direction; and (4) digitizing data from step (c) to provide a digital signal defining a boundary of each lens in data conforming to a format for said numerically controlled edger.

4. A method according to claim 3 including, between steps (3) and (4) of adjusting said coordinate system as determined in step (1) to find a true coordinate system utilizing information determined in steps (2) and (3).

5. A method according to claim 3 including the step of evaluating and comparing data from each lens with the other to provide means of detecting errors in said digital data defining the boundaries of each lens.

* * * * *

UNITED STATES PATENT AND TRADEMARK OFFICE
CERTIFICATE OF CORRECTION

PATENT NO. : 5,257,198

DATED : October 26, 1993

INVENTOR(S) : Carol G. Van Schoyck

It is certified that error appears in the above-identified patent and that said Letters Patent is hereby corrected as shown below:

Column 1, line 55, delete "laser".
Column 1, line 55, change "with" to --of--.
Column 1, line 55, delete "and".
Column 1, line 56, delete "will be provided as part of the system".
Column 1, line 57, change "glass" to --wear--.
Column 1, line 60, delete "selected".
Column 1, line 60, after "places, insert --selected--.
Column 1, line 61, change "the" to --a--.
Column 1, line 61, change "of" to --on--.
Column 1, line 62, delete "prescribed lens on the".
Column 4, line 1, delete "The horizontal".
Column 4, line 2, delete "axis of the demonstration lenses before they are re-"
Column 4, line 3, delete "moved from the frame.".

UNITED STATES PATENT AND TRADEMARK OFFICE
CERTIFICATE OF CORRECTION

PATENT NO. : 5,257,198

DATED : October 26, 1993

INVENTOR(S) : Carol G. Van Schoyck

It is certified that error appears in the above-identified patent and that said Letters Patent is hereby corrected as shown below:

Column 4, line 48, after "puter" insert --,--.
Column 6, line 39, after "ophthalmoscopic" insert --means--.
Column 8, line 3, change "taking" to --making--.
Column 8, line 6, change "(c)" to --(3)--.

Signed and Sealed this

Thirteenth Day of December, 1994

Attest:

BRUCE LEHMAN

Attesting Officer

Commissioner of Patents and Trademarks